(12) United States Patent
Lai et al.

(10) Patent No.: US 11,098,844 B1
(45) Date of Patent: Aug. 24, 2021

(54) WALL MOUNT ASSEMBLY

(71) Applicant: GIGA-BYTE TECHNOLOGY CO., LTD., New Taipei (TW)

(72) Inventors: Chih-Ming Lai, New Taipei (TW); Yu-Chi Peng, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/925,342

(22) Filed: Jul. 10, 2020

(30) Foreign Application Priority Data

Mar. 17, 2020 (TW) .................... 109108850

(51) Int. Cl.
*F16M 11/04* (2006.01)
*F16M 13/02* (2006.01)

(52) U.S. Cl.
CPC .......... *F16M 13/02* (2013.01); *F16M 11/041* (2013.01)

(58) Field of Classification Search
CPC .............................. F16M 13/02; F16M 11/041
USPC .... 248/115, 220.22, 220.41, 221.12, 222.14, 248/223.31, 222.41
See application file for complete search history.

(56) References Cited

U.S. PATENT DOCUMENTS

| | | | | |
|---|---|---|---|---|
| 2,277,738 | A * | 3/1942 | Wilkinson | B01D 27/00 210/249 |
| 4,558,839 | A * | 12/1985 | Kaplan | F16M 13/02 248/221.12 |
| 5,420,762 | A * | 5/1995 | Lewis | B60Q 1/0441 24/701 |
| 10,307,313 | B2 * | 6/2019 | Schroeder | A47B 96/067 |
| 10,683,963 | B2 * | 6/2020 | Schroeder | B60P 7/0815 |
| 10,774,982 | B2 * | 9/2020 | Sung | F16M 11/04 |
| 10,876,325 | B2 * | 12/2020 | Cheung | G06F 1/1607 |
| 2007/0046837 | A1 * | 3/2007 | Elberbaum | F16M 13/02 348/739 |
| 2007/0057133 | A1 * | 3/2007 | Cottingham | F16M 13/02 248/309.1 |
| 2018/0266101 | A1 * | 9/2018 | Haba | E04B 2/789 |
| 2019/0261525 | A1 * | 8/2019 | Chiu | G06F 1/1607 |
| 2020/0329570 | A1 * | 10/2020 | Monroe | H05K 5/0017 |
| 2021/0156510 | A1 * | 5/2021 | Li | F16M 13/005 |

* cited by examiner

*Primary Examiner* — Bradley Duckworth
(74) *Attorney, Agent, or Firm* — Idea Intellectual Limited; Margaret A. Burke; Sam T. Yip

(57) ABSTRACT

A wall mount assembly includes a case body, a latch member, a fixing plate, and a fixation member. A slit is formed on a rear surface of the case body. A first fixation hole is formed on an outer peripheral surface of the case body and communicates with the slit. The latch member is disposed on the rear surface. The fixing plate includes a latch hole and a lug. The latch member passes through the latch hole and engages with the fixing plate. The lug is inserted into the slit. When the latch member is located at a closed end of a sliding slot portion of the latch hole, a projection of the first fixation hole on the lug overlaps a second fixation hole of the lug. The fixation member is inserted into the first and the second fixation holes from the outer peripheral surface.

13 Claims, 14 Drawing Sheets

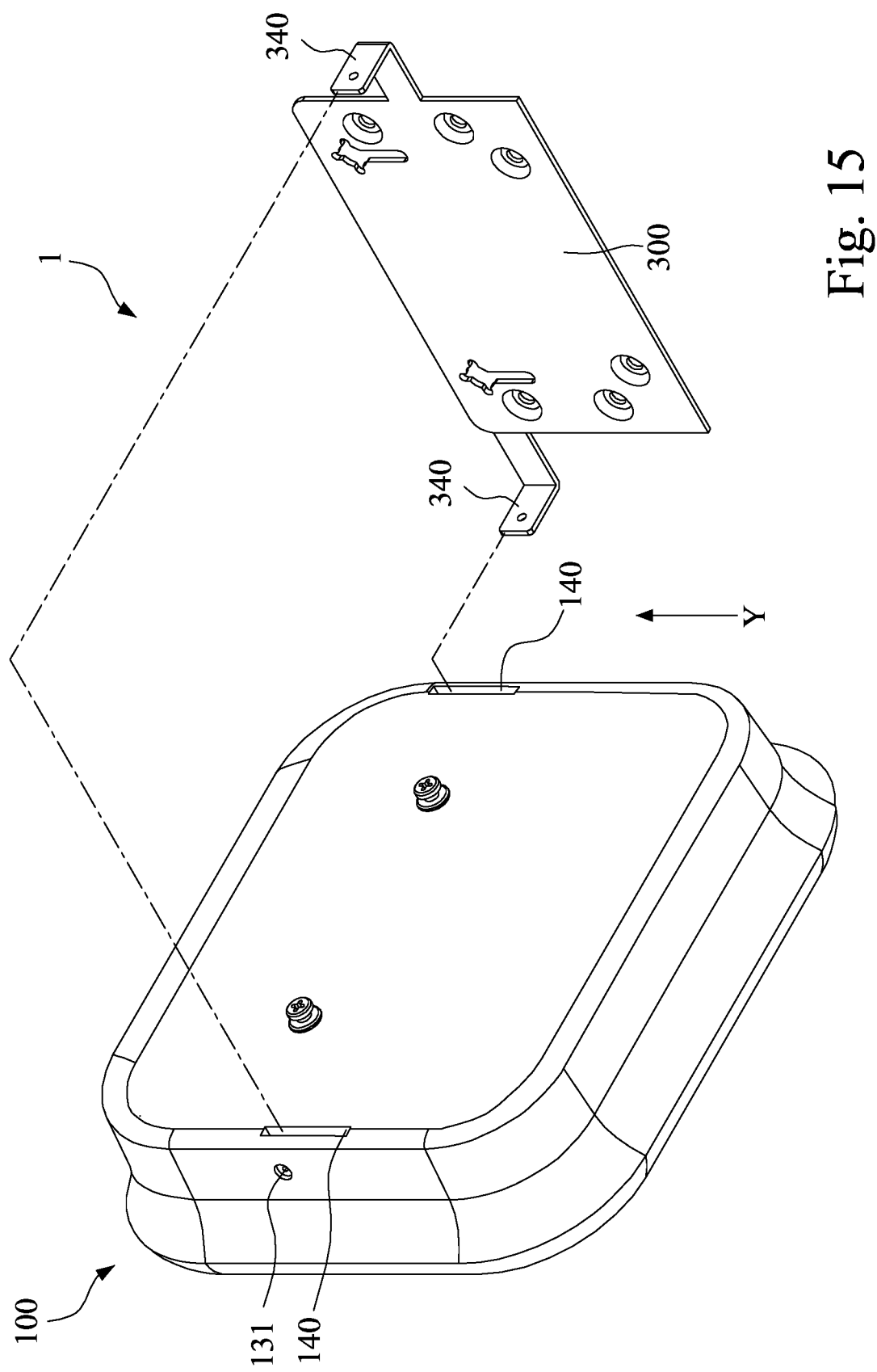

WALL MOUNT ASSEMBLY

CROSS-REFERENCE TO RELATED APPLICATION

This non-provisional application claims priority claim under 35 U.S.C. § 119(a) to Taiwan Patent Application No. 109108850 filed on Mar. 17, 2020, the entire contents of which are hereby incorporated by reference.

BACKGROUND

Technical Field

This disclosure relates to a wall mount structure, and in particular to a wall mount device which can be prevented from being detached off the wall when the wall mount device is impacted.

Related Art

In a wall mount structure known to the inventor, the latch hole and the latch member are respectively configured at the fixing plate and the object to be mounted (hereinafter, the object for short). In general, the fixing plate is fixedly disposed on the wall surface, and the latch member is disposed on the object. Therefore, by engaging the latch member into the latch hole, the object can be mounted on the wall surface. In general, the latch hole may be a keyhole, and the latch member may be a screw. In addition to the screw head of the screw, the thread of the screw is partially exposed from the surface of the object. The screw head passes through the keyhole firstly, and then the exposed portion of the screw slides into the slit portion of the keyhole, the object is mounted on to the wall.

The fixation force for the object is completely contributed by the downward force of the weight of the object. Under this configuration, the object may be easily moved upwardly due to being impacted, thereby causing the latch member detaching off the slit portion of the keyhole. Hence, the object will be detached off the fixing plate and falls on the ground. Moreover, in order to avoid the latch members and the latch holes from aligning with each other improperly, one or two sets of latch member/latch hole are usually provided on the wall mount structure. However, it is understood that, the object cannot be firmly mounted on the surface of the fixing plate with just one or two fixation points. As a result, the lower portion of the object may be flipped upwardly due to impacts, and the object may impact the wall surface or the fixing plate when the object moves resiliently back to the original position of the object, thereby causing the damage of the object easily.

SUMMARY

In the wall mount structure configured with the keyhole, the fixation force is insufficient.

In view of this, this disclosure proposes a wall mount assembly capable of providing a stable fixation performance for the object to be mounted on the wall surface.

An embodiment of this disclosure provides a wall mount assembly. The wall mount assembly comprises a case body, a latch member, a fixing plate, and a fixation member. The case body includes a front surface, a rear surface, and an outer peripheral surface connected to the front surface and the rear surface. A slit is formed on the rear surface, and the slit extends in an installation direction. A first fixation hole is formed on the outer peripheral surface and communicates with the slit. The latch member is disposed on the rear surface. The fixing plate includes a wall mount surface and an installation surface. The fixing plate further includes a latch hole and a lug. The latch hole includes an opening portion and a sliding slot portion. The opening portion is adapted to allow the latch member to pass through from the installation surface, so as to allow the latch member to slide into the sliding slot portion and to engage with the wall mount surface. The lug perpendicularly extends from the installation surface and is adapted to be inserted into the slit. An extension direction of the sliding slot portion is in parallel to the lug, and the lug further has a second fixation hole. When the lug is inserted into the slit and the latch member is located at a closed end of the sliding slot portion, a projection of the first fixation hole on the lug overlaps the second fixation hole. The fixation member is inserted into the first fixation hole and the second fixation hole from the outer peripheral surface.

In at least one embodiment, the latch member includes a pillar portion and a stopping portion. The pillar portion is fixed on the rear surface, and the stopping portion is disposed on the pillar portion. The pillar portion is adapted to be slid in the sliding slot portion. The stopping portion is adapted to pass through the opening portion, and the stopping portion stops the pillar portion from being detached off the sliding slot portion along a longitudinal direction of the pillar portion.

In at least one embodiment, a relative position between the lug and the latch hole is configured as that, when the latch member is inserted into a center of the opening portion, the lug is capable of being inserted into the slit, and the lug is spaced apart from an upper end of the slit.

In at least one embodiment, a length from the center of the opening portion to the closed end of the sliding slot portion is greater than or equal to the spacing between the upper end of the slit and the lug.

In at least one embodiment, the installation surface further includes a horizontal extension portion outwardly extending from an edge of the fixing plate, and the lug is disposed on the horizontal extension portion.

In at least one embodiment, at least one bump is disposed on the wall mount surface.

In at least one embodiment, the fixation member is a screw, and the first fixation hole and the second fixation hole are a combination of a through hole and a screw hole.

In at least one embodiment, the first fixation hole includes a hole-expanding section at the outer peripheral surface, a head portion of the screw is received in the hole-expanding section and does not protrude from the outer peripheral surface, and the wall mount assembly further includes a hole plug adapted to seal the hole-expanding section.

In at least one embodiment, the fixation member is a screw, the first fixation hole is a screw hole, the second fixation hole is a through hole, and a pore diameter of the second fixation hole is greater than a pore diameter of the first fixation hole.

In at least one embodiment, the pore diameter of the second fixation hole is less than a length of the sliding slot portion in the installation direction.

In at least one embodiment, the fixation member is a screw, the first fixation hole is a screw hole, the second fixation hole is an elongated slot-hole, and an extension direction of the elongated slot-hole is in parallel to the slit.

In at least one embodiment, a length of the elongated slot-hole in the installation direction is less than a length of the sliding slot portion in the installation direction.

In at least one embodiment, the lug further includes a hook portion adapted to be engaged with an inner wall of the case body.

According to one or some embodiments of this disclosure, by the application of the slit and the lug, besides of the fixation caused by the weight of the case body additional fixations can be provided for the case body. Hence, the case body can be effectively prevented from falling off or from being flipped upwardly due to being impacted. Moreover, the wall mount assembly according to one or some embodiments of this disclosure, the fixing plate can be shielded by the case body and is not exposed, thereby improving the aesthetics of the wall mount assembly.

BRIEF DESCRIPTION OF THE DRAWINGS

The present invention will become more fully understood from the detailed description given herein below for illustration only, and thus not limitative of the present invention, wherein:

FIG. 15 illustrates an exploded view of a wall mount assembly according to a fourth embodiment of this disclosure.

DETAILED DESCRIPTION

Figure 1:
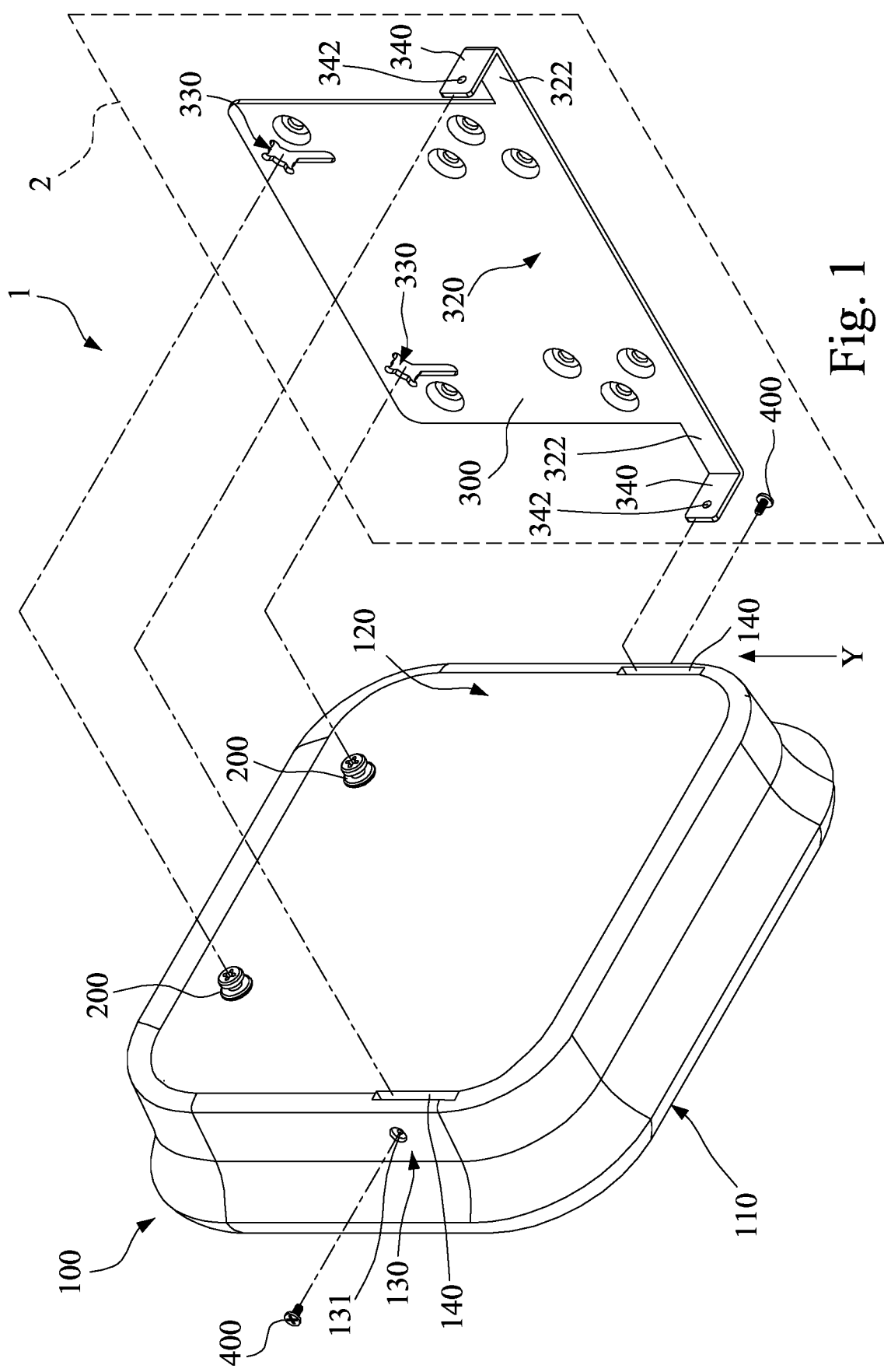
FIG. 1 illustrates an exploded view of a wall mount assembly according to a first embodiment of this disclosure.
Figure 2:
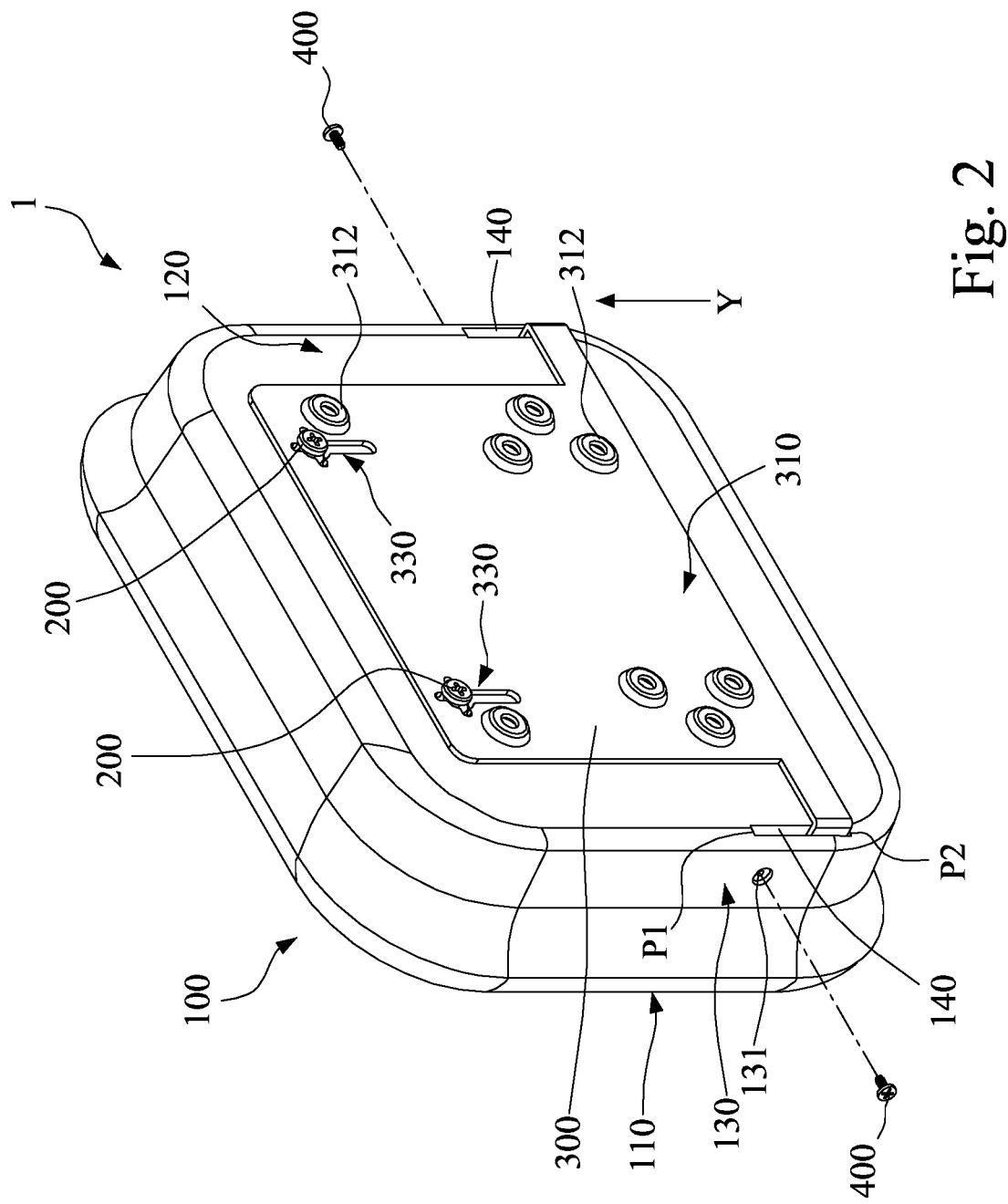
FIG. 2 illustrates a partial exploded view of the wall mount assembly of the first embodiment.
Figure 3:
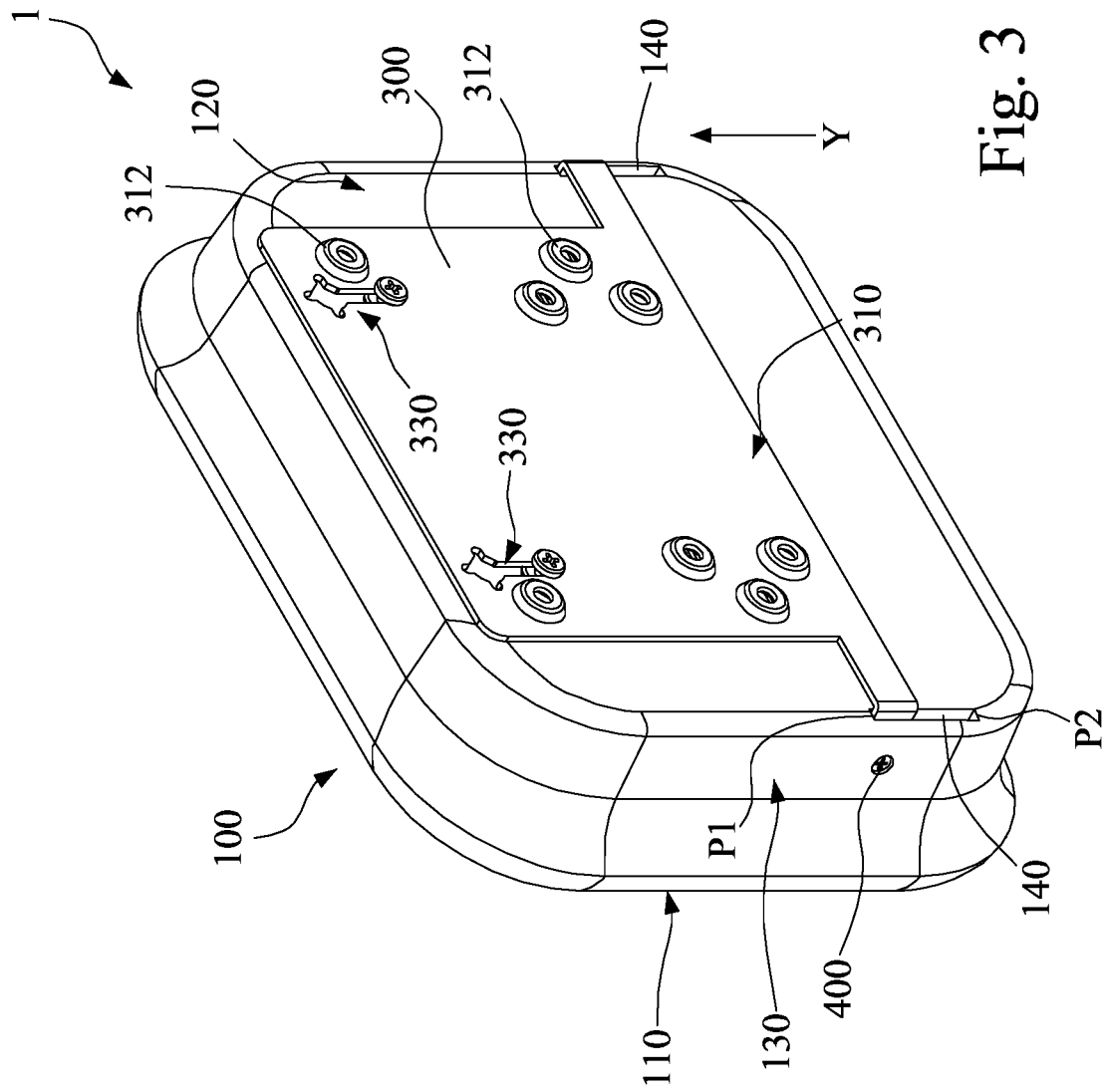
FIG. 3 illustrates a perspective view of the wall mount assembly of the first embodiment.

Please refer to FIG. 1, FIG. 2, and FIG. 3, which illustrate a wall mount assembly 1 according to a first embodiment of this disclosure. The wall mount assembly 1 includes a case body 100, one or plural latch members 200, a fixing plate 300, and one or plural fixation members 400. It is understood that the term "plural" indicates two or more than two. The fixing plate 300 is fixedly disposed on a standing wall surface 2. By the combination of the latch member(s) 200 and the fixation member(s) 400, the case body 100 is detachably assembled on the fixing plate 300, so that the case body 100 can be fixed on the wall surface 2. The case body 100 may be, but not limited to the casing of an electronic device.

As shown in FIG. 1, FIG. 2, and FIG. 3, the case body 100 includes a front surface 110, a rear surface 120, and an outer peripheral surface 130 connected to the front surface 110 and the rear surface 120. One or plural slits 140 are formed on the rear surface 120. The slit 140 extends in an installation direction Y. A first fixation hole 131 is formed on the outer peripheral surface 130, and the first fixation hole 131 communicates with the slit(s) 140. The latch member 200 is fixed on the rear surface 120.

As shown in FIG. 1, FIG. 2, and FIG. 3, the fixing plate 300 includes a wall mount surface 310 and an installation surface 320. One or plural bumps 312 are disposed on the wall mount surface 310. The bumps 312 are adapted to allow screws, nails, or other fixing components to pass through and to be fixed on the wall surface 2. Accordingly, the fixing plate 300 can be fixed on the wall surface 2 in a configuration that the wall mount surface 310 of the fixing plate 300 faces the wall surface 2. Moreover, the wall mount surface 310 is spaced apart from the wall surface 2 by the bumps 312; in other words, instead of having the wall mount surface 310 closely attached on the wall surface 2, a gap is between the wall mount surface 310 and the wall surface 2.

As shown in FIG. 1, FIG. 2, and FIG. 3, the fixing plate 300 further includes one or plural latch holes 330 and one or plural lugs 340.

Figure 5:
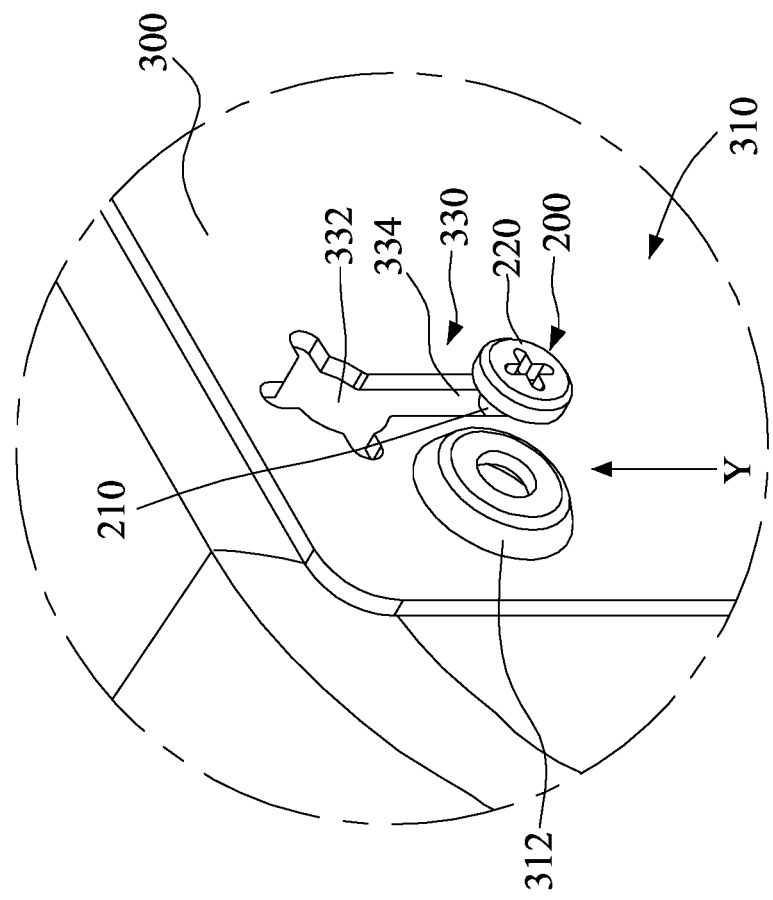
FIG. 5 illustrates another enlarged perspective view of the latch member and the latch hole of the wall mount assembly of the first embodiment.
Figure 4:
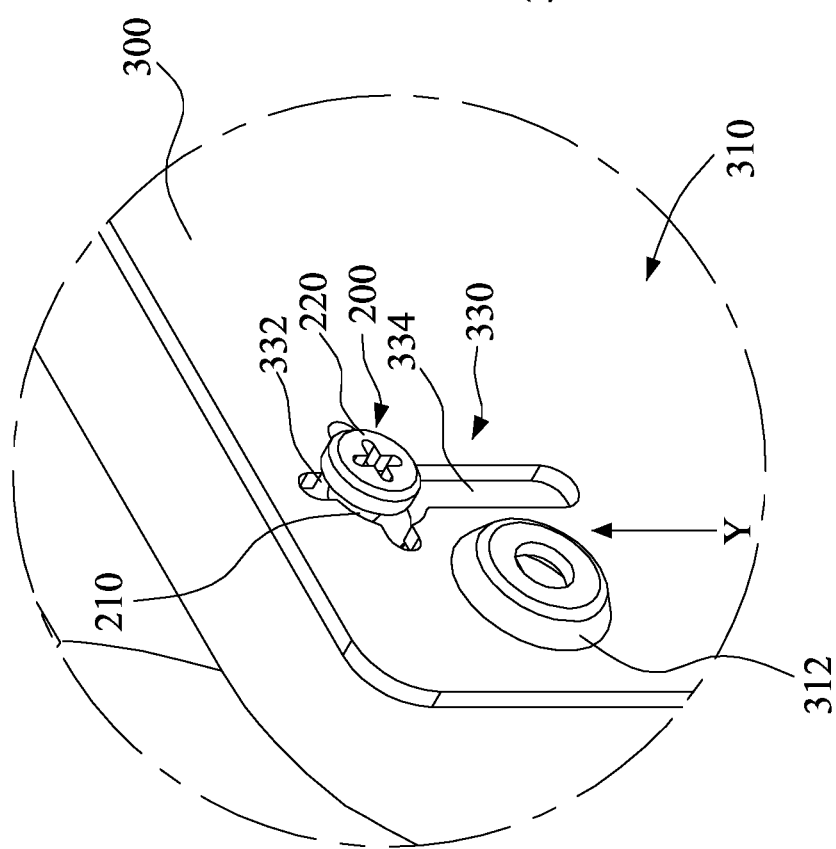
FIG. 4 illustrates an enlarged perspective view of the latch member and the latch hole of the wall mount assembly of the first embodiment.

As shown in FIG. 4 and FIG. 5, the latch hole 330 includes an opening portion 332 and a sliding slot portion 334. The opening portion 332 is adapted to allow the latch member 200 to pass through from the installation surface 320, so as to allow the latch member 200 to slide into the sliding slot portion 334 and to engage with the wall mount surface 310.

As shown in FIG. 1, FIG. 4, and FIG. 5, in the first embodiment, the latch member 200 includes a pillar portion 210 and a stopping portion 220. The pillar portion 210 is fixed on the rear surface 120, and the stopping portion 220 is disposed on the pillar portion 210. The pillar portion 210 is adapted to be slid in the sliding slot portion 334, and the stopping portion 220 is adapted to pass through the opening portion 332. The stopping portion 220 stops the pillar portion 210 from being detached off the sliding slot portion 334 along a long longitudinal direction of the pillar portion 210. In one embodiment, both the pillar portion 210 and the stopping portion 220 have circular cross-sections. Moreover, in the embodiment, the cross-sectional area of the stopping portion 220 is less than the cross-sectional area of the opening portion 332, the diameter of the stopping portion 220 is greater than the width of the sliding slot portion 334, and the diameter of the pillar portion 210 is less than the width of the sliding slot portion 334.

Figure 6:
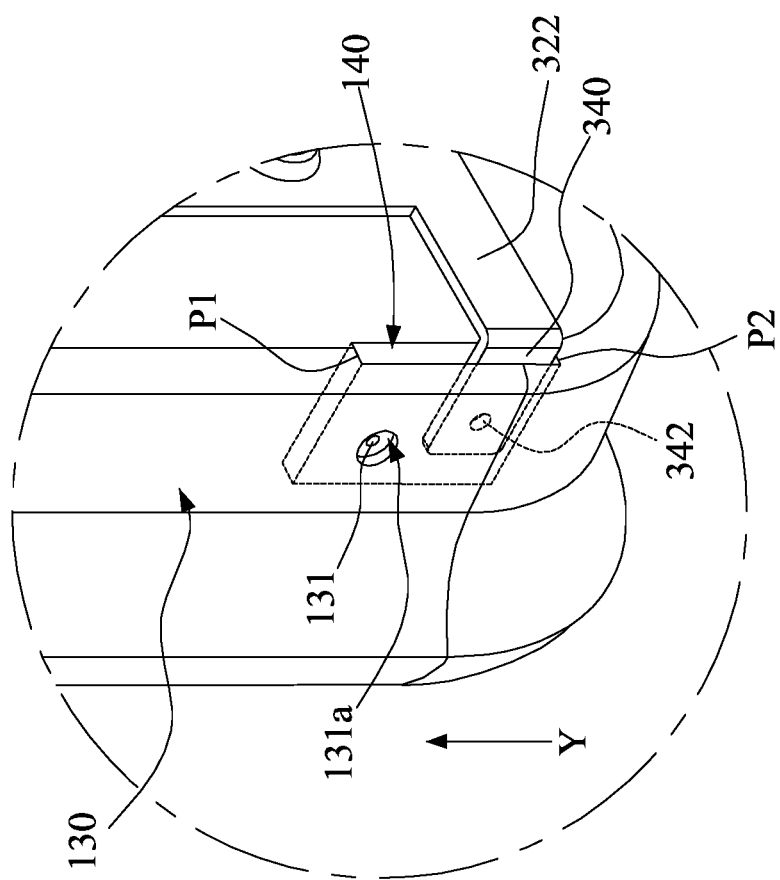
FIG. 6 illustrates an enlarged perspective view of the lug and the slit of the wall mount assembly of the first embodiment.
Figure 7:
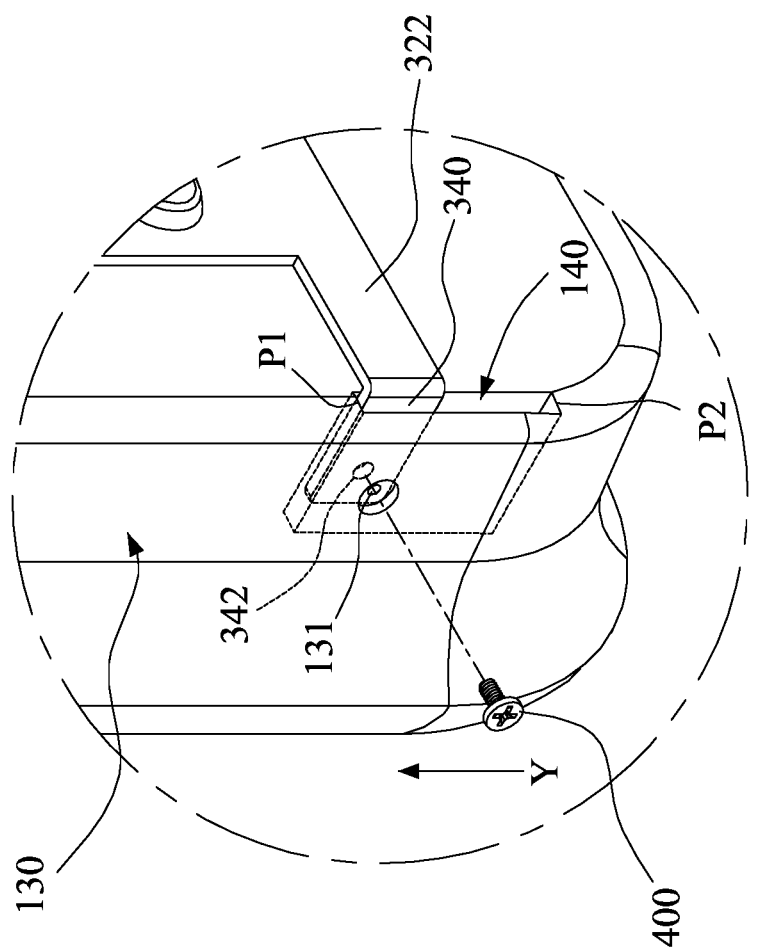
FIG. 7 illustrates another enlarged perspective view of the lug and the slit of the wall mount assembly of the first embodiment.

As shown in FIG. 1, FIG. 6, and FIG. 7, the number of the lug 340 is equal to the number of the slit 140; in other words, each of the lugs 340 is arranged corresponding to one of the slits 140. The lug 340 perpendicularly extends from the installation surface 320, and the lug 340 is adapted to be inserted into the slit 320. In the first embodiment, the installation surface 320 further includes a horizontal extension portion 322 outwardly extending from an edge of the fixing plate 300, and the lug 340 is disposed on the horizontal extension portion 322. Moreover, the extension direction of the sliding slot portion 334 of the latch hole 330 is in parallel to the lug 340.

As shown in FIG. 1, FIG. 6, and FIG. 7, the lug 340 includes a second fixation hole 342. When the latch member 200 is inserted into the fixing plate 300 from the installation surface 320, the lug 340 can be inserted into the corresponding slit 140 at the same time. When the case body 100 is moved to allow the latch member 200 to be located at a closed end of the sliding slot portion 334, a projection of the first fixation hole 131 on the lug 340 overlaps the second fixation hole 342.

As shown in FIG. 2, FIG. 3, and FIG. 7, the fixation member 400 is adapted to be inserted into the first fixation hole 131 and the second fixation hole 342 from the outer peripheral surface 130, so that the lug 340 is fixed to the case body 100. Hence, the case body 100 cannot move upwardly or downwardly with respect to the fixing plate 300. Accordingly, the case body 100 can be prevented from moving upwardly and then falling off due to being impacted. Moreover, with the combination of the latch member 200 and the fixation member 400, the rear surface 120 of the case body 100 can be closely attached on the installation surface 320, so that the bottom of the case body 100 can be prevented from being flipped upwardly due to being impacted.

The lug 340 is inserted into the case body 100 from the rear surface 120 of the case body 100 and the fixing plate 300 is fixed between the case body 100 and the wall surface 2. Therefore, the structure of the fixing plate 300 can be hidden when the case body 100 is fixed on the rear surface 120, thereby improving the aesthetics of the wall mount structure.

As shown in FIG. 2 and FIG. 3, the relative position between the lug 340 and the latch hole 330 is arranged according to the positions of the latch member 200 and the slit 140. The relative position between the lug 340 and the latch hole 330 is configured as that, when the latch member 200 is inserted into a center of the opening portion 332, the lug 340 is capable of being inserted into the slit 140, the lug 340 is spaced apart from an upper end P1 of the slit 140, and the lug 340 is also spaced apart from a lower end point P2 of the slit 140. Accordingly, the lug 340 can be inserted into the slit 140 without interference.

As shown in FIG. 2 and FIG. 3, after the lug 340 is inserted into the slit 140, the case body 100 has to be moved downwardly in the installation direction Y, so that the latch member 200 is capable of arriving at the closed end of the sliding slot portion 334. Accordingly, the length from the center of the opening portion 332 to the closed end of the sliding slot portion 334 is greater than or equal to the gap between the upper end P1 of the slit 140 and the lug 340. Therefore, before the latch member 200 arrives at the closed end of the sliding slot portion 334, the case body 100 can be mounted on the wall surface 2 through the latch member 200 due to the lug 340 is not stopped by the upper end P1.

In one or some embodiments of this disclosure, the fixation member 400 is a screw, and the first fixation hole 131 and the second fixation hole 342 are a combination of a through hole and a screw hole. In other words, as long as one of the fixation holes (the first fixation hole 131 and the second fixation hole 342) is a screw hole for threading with the fixation member 400, and the fixation member 400 does not need to be threaded with the first fixation hole 131 and the second fixation hole 342 at the same time.

Figure 8:
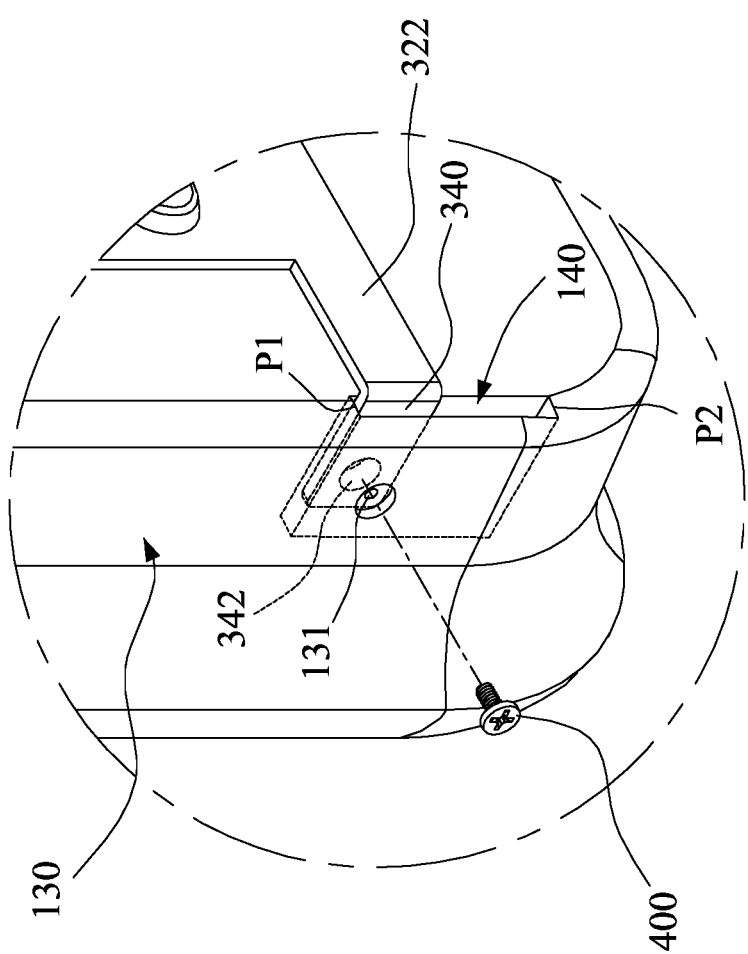
FIG. 8 illustrates further another enlarged perspective view of the lug and the slit of the wall mount assembly of the first embodiment.

As shown in FIG. 7 and FIG. 8, in the first embodiment, the first fixation hole 131 is a screw hole and the second fixation hole 342 is a through hole for an illustrative example. Under this configuration, the pore diameter of the second fixation hole 342 is greater than the pore diameter of the first fixation hole 131. In other words, the pore diameter of the second fixation hole 342 may be greater than the outer diameter of the screw so that the front end of the fixation member 400 (in this embodiment, the screw) can be inserted into the first fixation hole 131 and the second fixation hole 342 easily. The fixation member 400 can be easily aligned with the second fixation hole 342 and can be inserted into the second fixation hole 342 without performing precise alignment. As long as the fixation member 400 passes through the first fixation hole 131 and inserts into the second fixation hole 342, the upward and downward movements of the case body 100 with respect to the fixing plate 300 can be limited. Accordingly, the latch member 200 does not detach off the fixing plate 300 from the opening portion 332 of the latch hole 330.

It is understood that, a slight upward movement of the case body 100 is acceptable, as long as the pore diameter of the second fixation hole 342 is not large enough to allow the latch member 200 to enter into the opening portion 332 from the sliding slot portion 334 and to detach off the fixing plate 300. Under this configuration, the pore diameter of the second fixation hole 342 has to be less than the length of the sliding slot portion 334 of the latch hole 330 in the installation direction Y, so that the latch member 200 can be prevented from entering into the opening portion 332 from the sliding slot portion 334.

Figure 9:
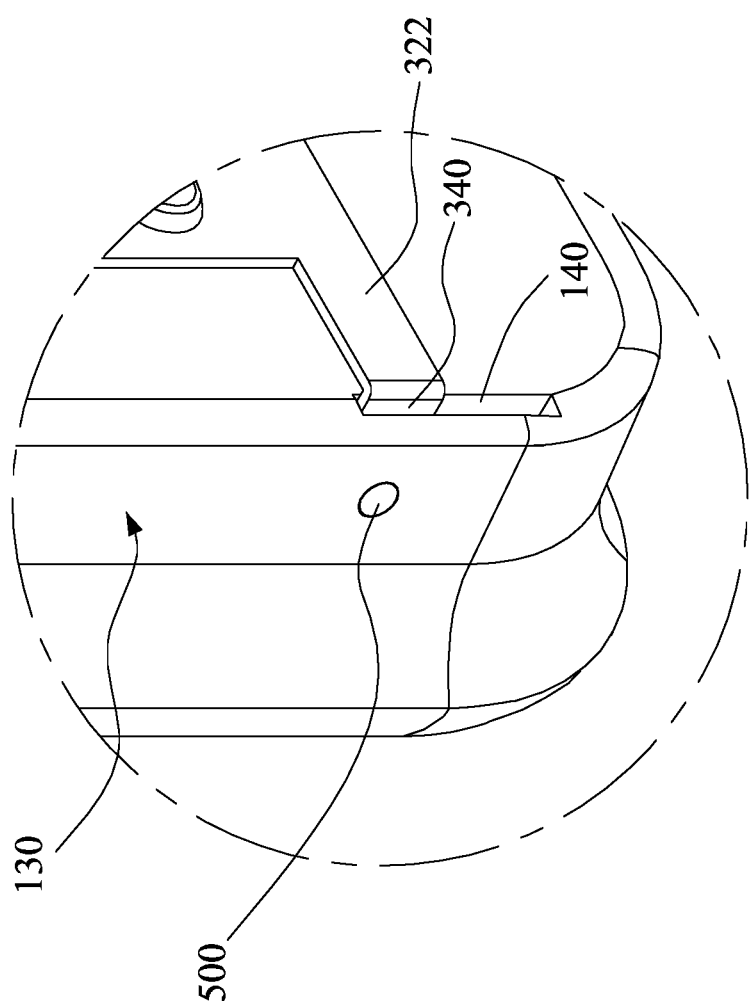
FIG. 9 illustrates still further another enlarged perspective view of the lug and the slit of the wall mount assembly of the first embodiment.

As shown in FIG. 6 and FIG. 9, moreover, in this embodiment, the first fixation hole 131 includes a hole-expanding section 131a at the outer peripheral surface 130, and a head portion of the screw is received in the hole-expanding section 131a and does not protrude from the outer peripheral surface 130. In this embodiment, an hole plug 500 may be provided for sealing the hole-expanding section 131a. Therefore, the flatness of the outer peripheral surface 130 can be retained and the outer peripheral surface 130 does not have recessed or protruding structures.

Figure 10:
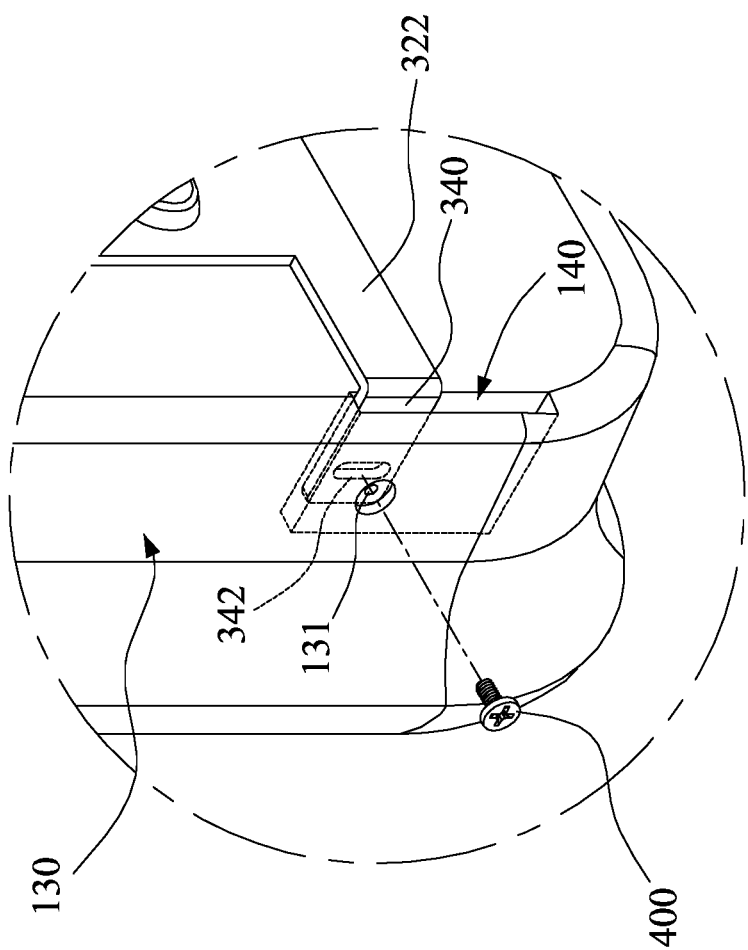
FIG. 10 illustrates still yet another enlarged perspective view of the lug and the slit of the wall mount assembly of the first embodiment.

As shown in FIG. 10, another configuration of a combination of the first fixation hole 131 and the second fixation hole 342 is illustrated. In this embodiment, the first fixation hole 131 is a screw hole and the second fixation hole 342 is an elongated slot-hole. The extension direction of the elongated slot-hole is in parallel to the slit 140. The second fixation hole 342 in the configuration of an elongated slot-hole also facilitates that the fixation member 400 can be aligned with the second fixation hole 342 easily. Similarly, in order to prevent the case body 100 from being detached off the fixing plate 300 after the slight upward movement of the case body 100, the length of the elongated slot-hole in the installation direction Y is less than the length of the sliding slot portion 334 of the latch hole 330 in the installation direction Y.

Figure 11:
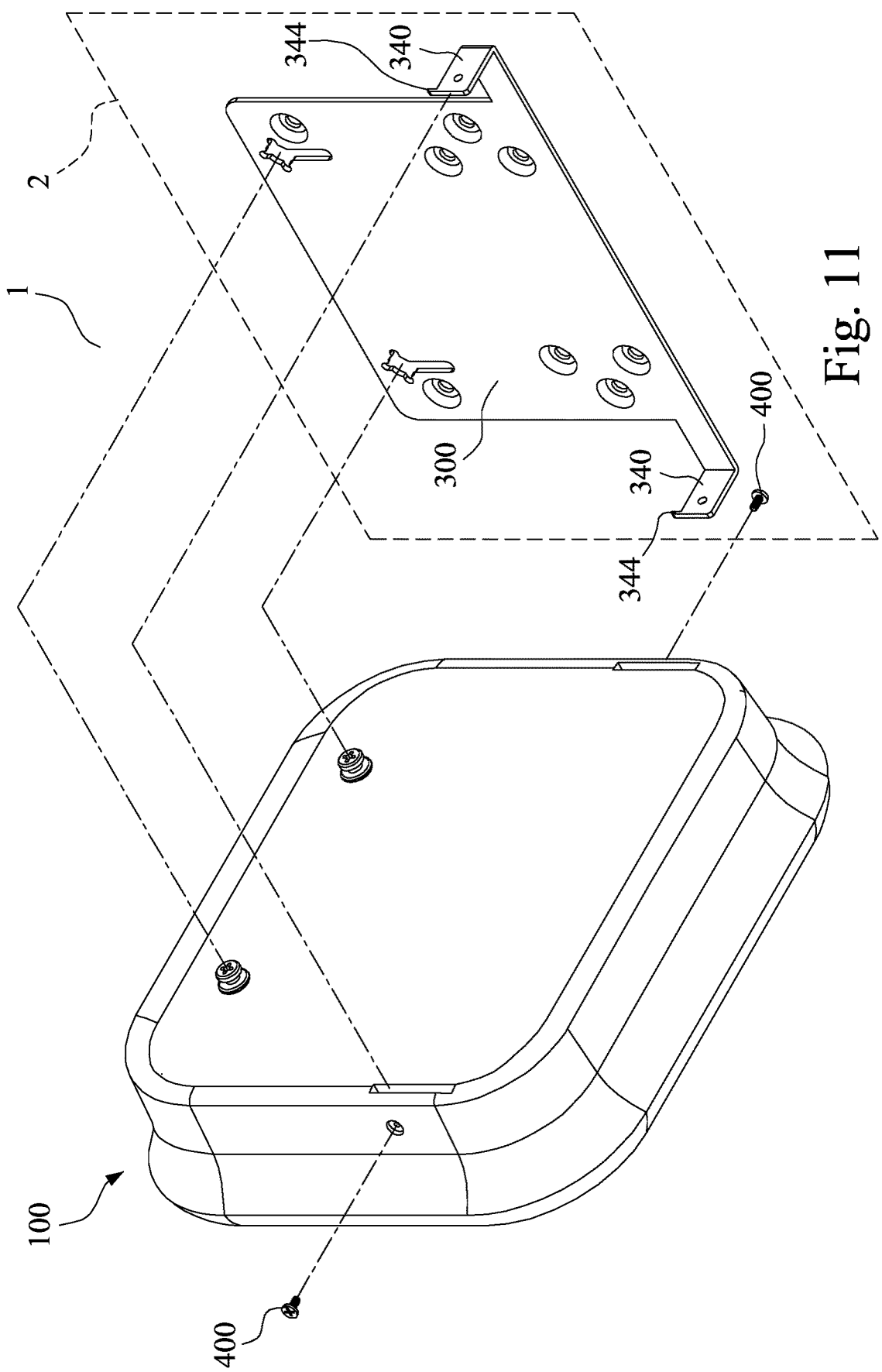
FIG. 11 illustrates an exploded view of a wall mount assembly according to a second embodiment of this disclosure.
Figure 12:
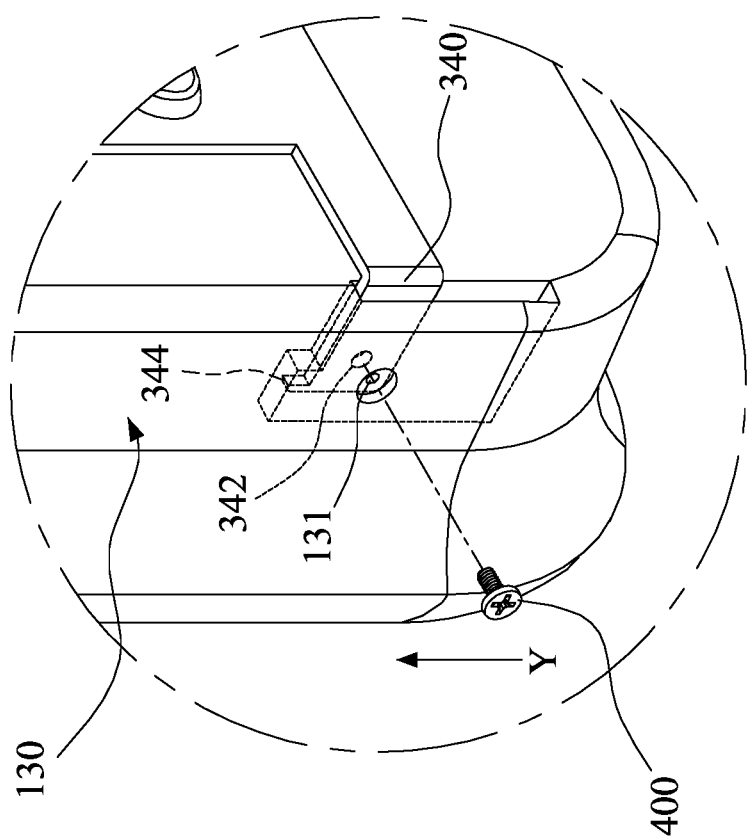
FIG. 12 illustrates an enlarged perspective view of the lug and the slit of the wall mount assembly of the second embodiment.

As shown in FIG. 11 and FIG. 12, a wall mount assembly according to a second embodiment of this disclosure is illustrated. In this embodiment, the wall mount assembly includes a case body 100, one or plural latch members 200, a fixing plate 300, and one or plural fixation members 400.

As shown in FIG. 11 and FIG. 12, in the second embodiment, the lug 340 further includes a hook portion 344 adapted to be engaged with the inner wall of the case body 100. The hook portion 344 can be provided for positioning the case body 100 in the horizontal direction before the fixation member 400 is fixed with the case body 100, so that the bottom of the case body 100 can be prevented from being flipped upwardly. Therefore, the hook portion 344 facilitates in aligning the fixation member 400 with the second fixation hole 342 and in inserting the fixation member 400 into the second fixation hole 342.

Figure 13:
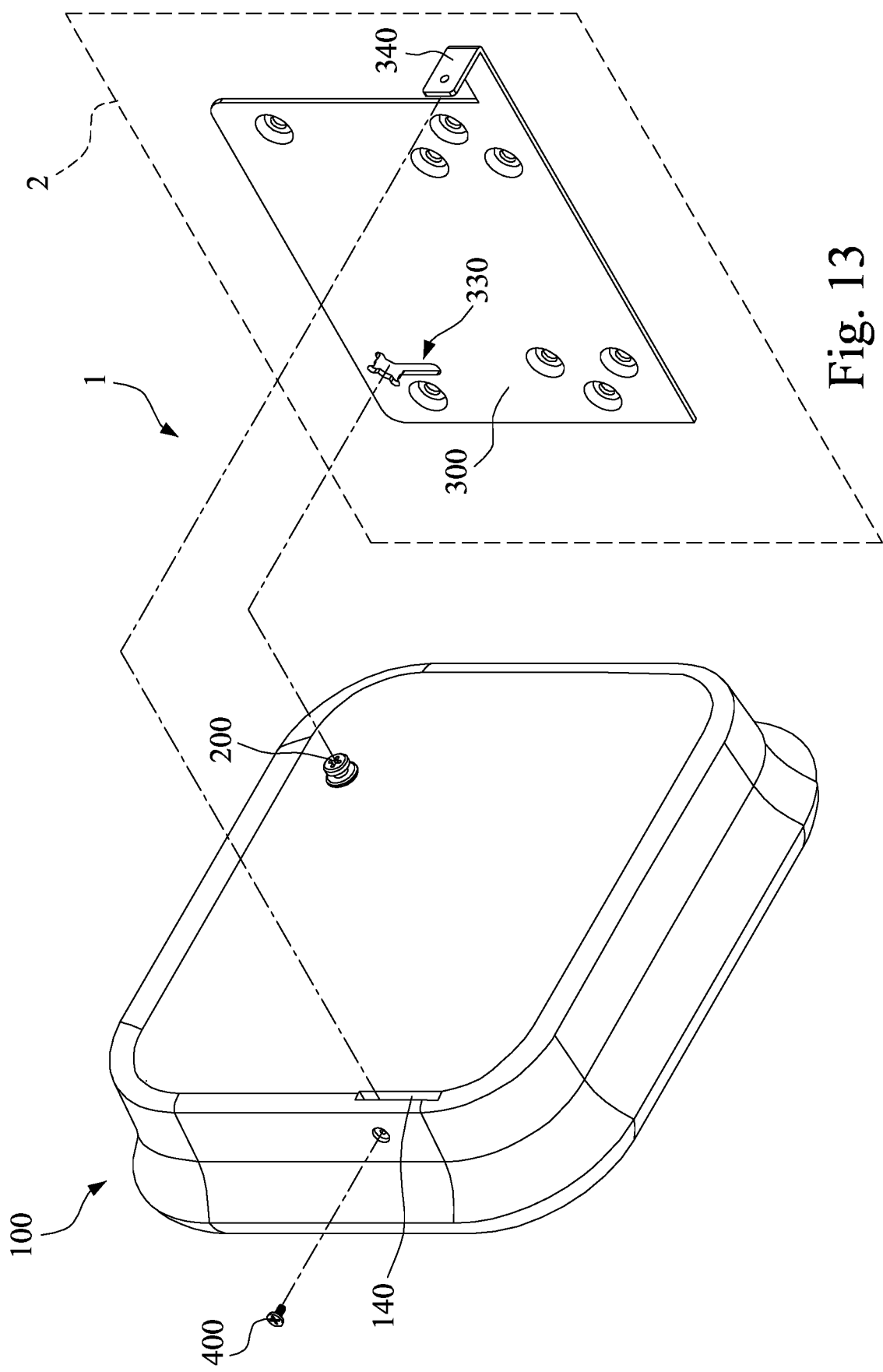
FIG. 13 illustrates an exploded view of a wall mount assembly according to a third embodiment of this disclosure.
Figure 14:
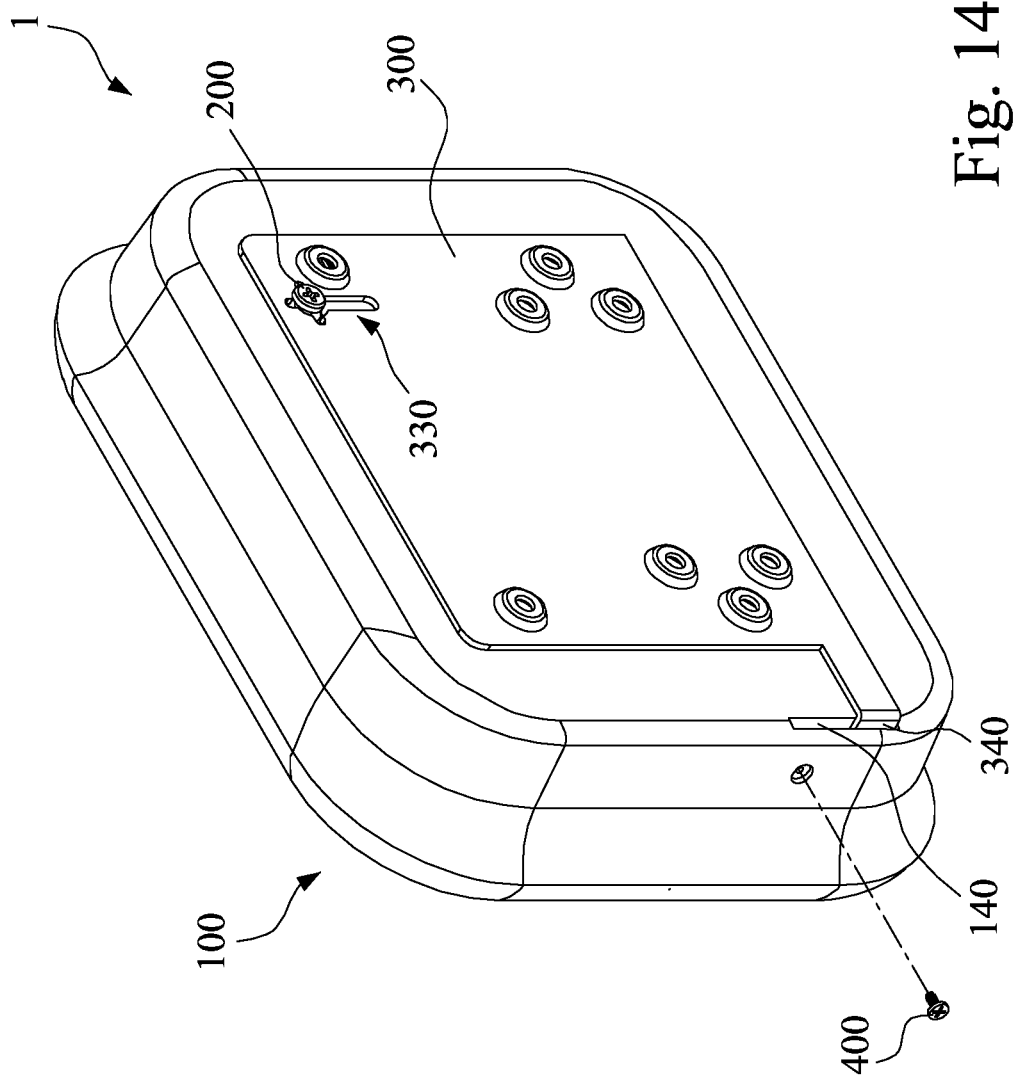
FIG. 14 illustrates a partial exploded view of the wall mount assembly of the third embodiment.

As shown in FIG. 13 and FIG. 14, a wall mount assembly according to a third embodiment of this disclosure is illustrated. In this embodiment, the number of the latch member 200, the latch hole 330, the lug 340, and the slit 140 can be changed. It is understood that, the wall mount assembly can just have one latch member 200, one latch hole 330, one lug 340, and one slit 140 to achieve the fixation of the case body 100 on the fixing plate 300.

As shown in FIG. 15, a wall mount assembly according to a fourth embodiment of this disclosure is illustrated. In this embodiment, the positions of the lug 340 and the slit 140 in the installation direction Y can be changed. It is understood that, the position of the lug 340 is not limited to be at the bottom portion of the side of the fixing plate 300; the position of the lug 340 may be configured at the middle portion or the top portion of the fixing plate 300. The lug 340 can be configured at different positions of the fixing plate 300, as long as the slit 140 is configured near the outer peripheral surface 130 of the case body 100 so as to facilitate the communication between the first fixation hole 131 and the slit 140.

According to one or some embodiments of this disclosure, by the application of the slit 140 and the lug 340, besides of the fixation caused by the weight of the case body 100 (electronic device), additional fixations can be provided for the case body 100 (electronic device). Hence, the case body 100 (electronic device) can be effectively prevented from falling off or from being flipped upwardly due to being impacted. Moreover, the wall mount assembly 1 according to one or some embodiments of this disclosure, the fixing plate 300 can be shielded by the case body 100 and is not exposed, thereby improving the aesthetics of the wall mount assembly 1.

What is claimed is:

1. A wall mount assembly, comprising:
   a case body, including a front surface, a rear surface, and an outer peripheral surface connected to the front surface and the rear surface; wherein a slit is formed on the rear surface and extends in an installation direction; a first fixation hole is formed on the outer peripheral surface and communicates with the slit;
   a latch member, disposed on the rear surface;
   a fixing plate, including a wall mount surface and an installation surface; wherein the fixing plate further includes:
      a latch hole, including an opening portion and a sliding slot portion; wherein the opening portion is adapted to allow the latch member to pass through from the installation surface, so as to allow the latch member to slide into the sliding slot portion and to engage with the wall mount surface; and
      a lug, perpendicularly extending from the installation surface and adapted to be inserted into the slit; wherein an extension direction of the sliding slot portion is in parallel to the lug, and the lug further includes a second fixation hole; wherein when the lug is inserted into the slit and the latch member is located at a closed end of the sliding slot portion, a projection of the first fixation hole on the lug overlaps the second fixation hole; and
   a fixation member, adapted to be inserted into the first fixation hole and the second fixation hole from the outer peripheral surface.

2. The wall mount assembly according to claim 1, wherein the latch member includes a pillar portion and a stopping portion; the pillar portion is fixed on the rear surface, and the stopping portion is disposed on the pillar portion; wherein the pillar portion is adapted to be slid in the sliding slot portion, the stopping portion is adapted to pass through the opening portion, and the stopping portion stops the pillar portion from being detached off the sliding slot portion along a longitudinal direction of the pillar portion.

3. The wall mount assembly according to claim 1, wherein a relative position between the lug and the latch hole is configured as that, when the latch member is inserted into a center of the opening portion, the lug is capable of being inserted into the slit, and the lug is spaced apart from an upper end of the slit.

4. The wall mount assembly according to claim 3, wherein a length from the center of the opening portion to the closed end of the sliding slot portion is greater than or equal to a gap between the upper end of the slit and the lug.

5. The wall mount assembly according to claim 1, wherein the installation surface further includes a horizontal extension portion outwardly extending from an edge of the fixing plate, and the lug is disposed on the horizontal extension portion.

6. The wall mount assembly according to claim 1, wherein at least one bump is disposed on the wall mount surface.

7. The wall mount assembly according to claim 1, wherein the fixation member is a screw, and the first fixation hole and the second fixation hole are a combination of a through hole and a screw hole.

8. The wall mount assembly according to claim 7, wherein the first fixation hole has a hole-expanding section at the outer peripheral surface, a head portion of the screw is received in the hole-expanding section and does not protrude from the outer peripheral surface, and the wall mount assembly further includes a hole plug adapted to seal the hole-expanding section.

9. The wall mount assembly according to claim 1, wherein the fixation member is a screw, the first fixation hole is a screw hole, the second fixation hole is a through hole, and a pore diameter of the second fixation hole is greater than a pore diameter of the first fixation hole.

10. The wall mount assembly according to claim 9, wherein the pore diameter of the second fixation hole is less than a length of the sliding slot portion in the installation direction.

11. The wall mount assembly according to claim 1, wherein the fixation member is a screw, the first fixation hole is a screw hole, the second fixation hole is an elongated slot-hole, and an extension direction of the elongated slot-hole is in parallel to the slit.

12. The wall mount assembly according to claim 11, wherein a length of the elongated slot-hole in the installation direction is less than a length of the sliding slot portion in the installation direction.

13. The wall mount assembly according to claim 1, wherein the lug further includes a hook portion adapted to be engaged with an inner wall of the case body.

* * * * *